United States Patent [19]

Vogel et al.

[11] 4,243,105
[45] Jan. 6, 1981

[54] FOLDABLE AGRICULTURAL IMPLEMENT

[75] Inventors: Lambert P. Vogel, Fargo, N. Dak.; Robert J. Steffl, Moorhead, Minn.

[73] Assignee: Westgo Industries, Inc., West Fargo, N. Dak.

[21] Appl. No.: 61,182

[22] Filed: Jul. 26, 1979

[51] Int. Cl.³ .............................................. A01B 73/00
[52] U.S. Cl. ....................................... 172/311; 16/137
[58] Field of Search ............... 172/311, 446, 456, 662, 172/668; 16/137

[56] References Cited

U.S. PATENT DOCUMENTS

| | | | |
|---|---|---|---|
| 3,763,937 | 10/1973 | Nuckols | 172/456 X |
| 3,774,693 | 11/1973 | Orthman | 172/311 |
| 3,828,860 | 8/1974 | Poland | 172/311 |
| 4,116,282 | 9/1978 | Hansen | 172/311 |
| 4,191,260 | 3/1980 | Klindworth | 172/311 |

*Primary Examiner*—George J. Marlo
*Attorney, Agent, or Firm*—Zarley, McKee, Thomte, Voorhees & Sease

[57] ABSTRACT

An agricultural implement comprising a tool bar having ground working tools supported thereon. The tool bar comprises a main frame with a pair of wing frames pivotally connected to the ends thereof. The wing frames are pivotally connected to the main frame so that the wing frame may be pivotally moved from a working position to a transport position over a portion of the main frame. The pivotal connection between each of the wing frames and the main frame comprises a first support secured to one end of the main frame and extending upwardly therefrom. A second support is secured to the inner end of the wing frame and also extends upwardly therefrom. The upper end portions of the first and second supports are pivotally connected about a horizontal axis which is transversely disposed to the length of the tool bar. A first linkage is pivotally connected at one end to the first support inwardly of and below the upper end thereof while a second linkage is pivotally connected at one end thereof to the second support outwardly of and below the upper end thereof. A third linkage is pivotally connected to and extends between the other ends of the first and second linkages. A power cylinder is positioned above the tool bar and has a cylinder body mounted on the third linkage. The cylinder rod of the power cylinder is pivotally connected to the pivotal connection between the upper ends of the first and second supports whereby extension of the cylinder rod from the cylinder body will pivotally move the wing frame from its operative position to its transport position and whereby retraction of the cylinder rod into the cylinder body will pivotally move the wing frame from its transport position to its operative position.

5 Claims, 8 Drawing Figures

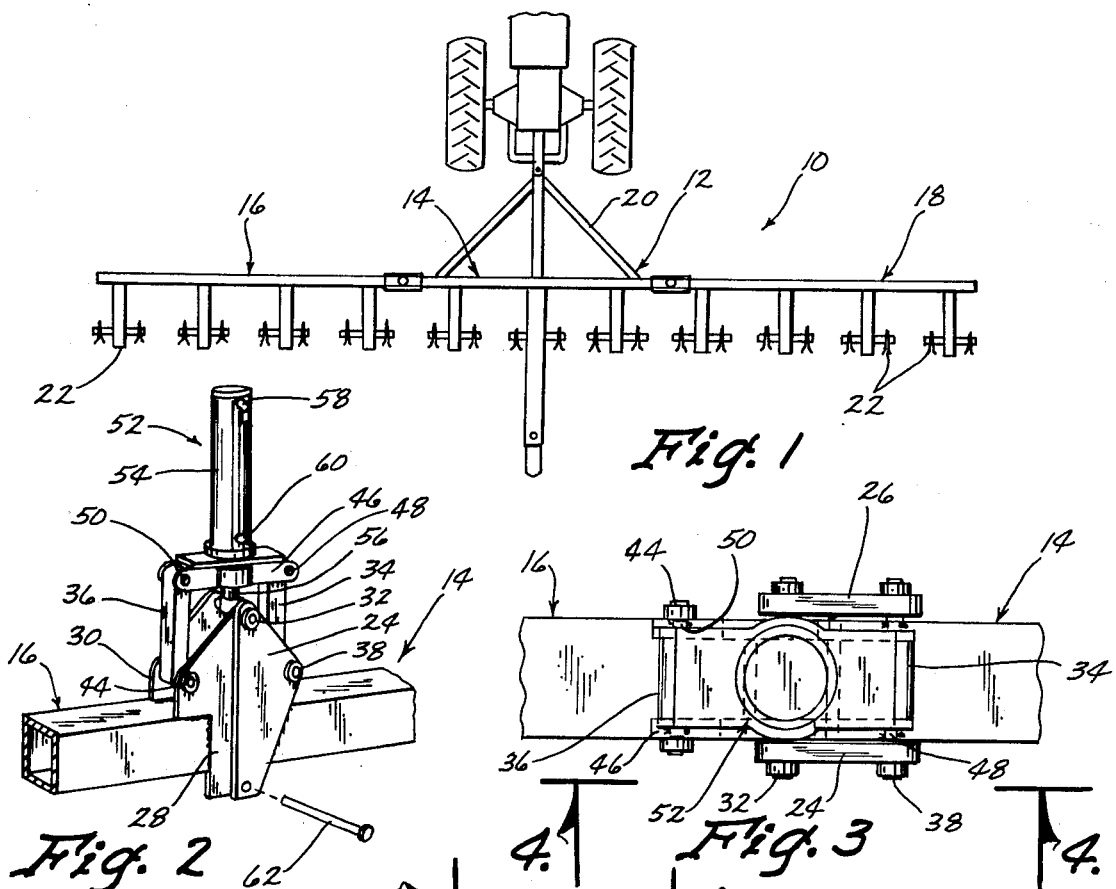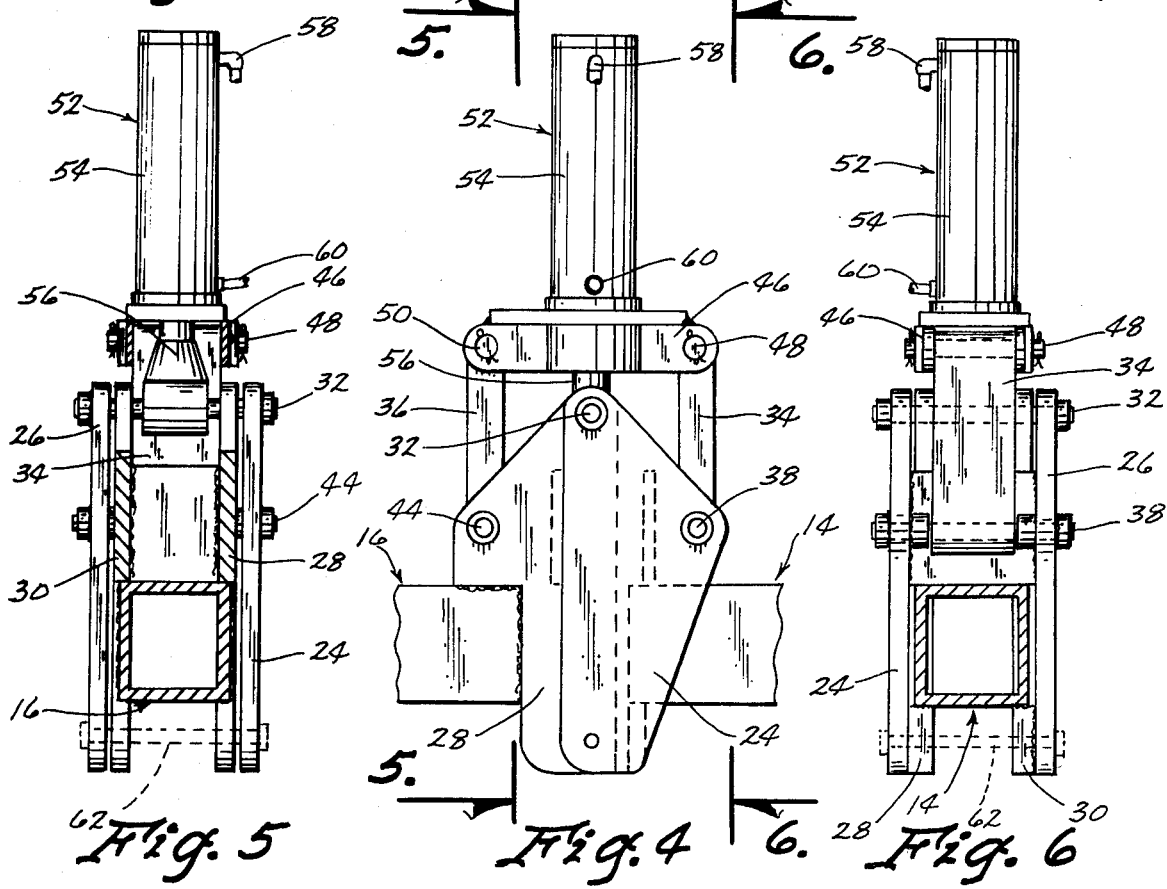

FOLDABLE AGRICULTURAL IMPLEMENT

BACKGROUND OF THE INVENTION

This invention relates to an agricultural implement and more particularly to an agricultural implement having a wing frame which may be pivotally moved 180° from a working position to a transport position.

Many types of agricutural implements have been previously provided wherein wing frames are pivotally connected to a main tool bar frame. However, only a few of the existing devices are able to pivotally move the wing frame 180° from a working position to a transport position. One type of implement having a wing frame which may be pivotally moved 180° from a horizontal transport position to a horizontal field position is described in U.S. Pat. No. 3,828,860. In the implement described in the above identified patent, the pivotal movement of the wing frame is accomplished by means of a hydraulic cylinder and an elaborate linkage connecting the same. Other folding tool bars also suffer some shortcomings such as uneven or irregular pivotal travel rate during folding and obstructions on the tool bar which interfere with the normal operation of the tool bar.

Therefore, it is a principal object of the invention to provide an agricultural implement having a tool bar with wings which may be folded 180° from a field working position to a transport position.

A further object of the invention is to provide a folding tool bar for use on an agricultural implement wherein the wing frames are pivotally moved substantially at a constant rate during the folding operation.

A still further object of the invention is to provide an agricultural implement having a folding tool bar wherein substantial obstructions are eliminated from the tool bar.

A still further object of the invention is to provide an agricultural implement having a folding tool bar wherein the power cylinder is used as the secondary linkage.

A still further object of the invention is to provide an agricultural implement having a folding tool bar which is economical of manufacture and durable in use.

These and other objects will be apparent to those skilled in the art.

BRIEF DESCRIPTION OF THE DRAWINGS

FIG. 1 is a top view of the invention:

FIG. 2 is a perspective view of the means which pivotally connects the main frame and one of the wing frames:

FIG. 3 is a top view of the pivotal connection of FIG. 2:

FIG. 4 is a sectional view seen on lines 4—4 of FIG. 3:

FIG. 5 is a sectional view seen on lines 5—5 of FIG. 4:

FIG. 6 is a sectional view seen on lines 6—6 of FIG. 4:

SUMMARY OF THE INVENTION

Figures 7, 8:
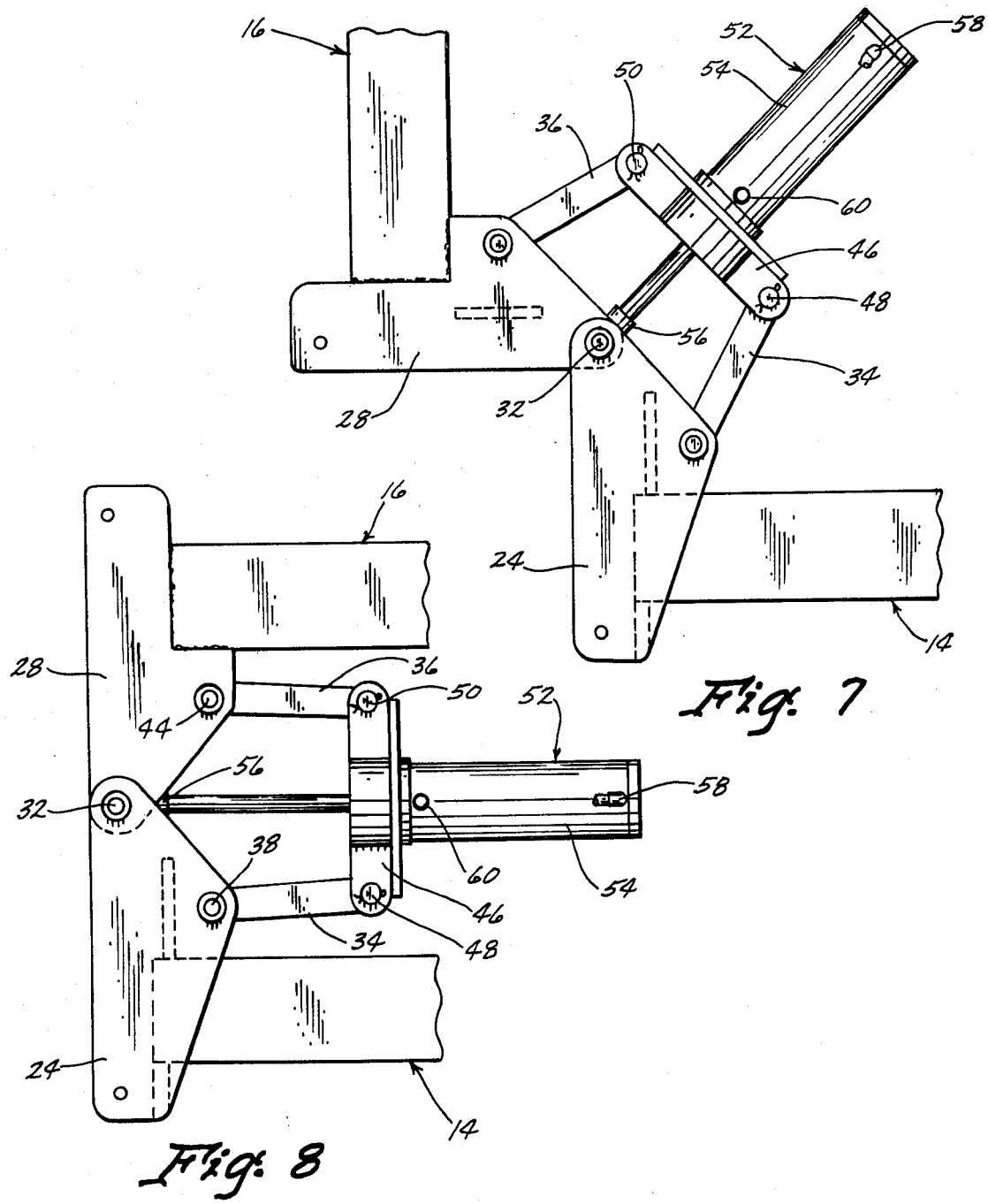
FIG. 7 is a side view of the pivotal connection with the wing frame being pivotally moved towards its transport position.
FIG. 8 is a side view illustrating the wing frame being pivotally moved to its transport position.

An agricultural implement is disclosed including a tool bar having a main frame with folding wings mounted on the opposite ends thereof. A vastly simplified arrangement is provided for moving the wing frames from a horizontal working position to a horizontal transport position. The inner end of each of the wing frames is pivotally connected to one end of the main frame in such a manner so that the power cylinder functions as the secondary linkage connecting the same. Extension of the cylinder rod from the cylinder body of the power cylinder pivotally moves the wing frame from its working position to its transport position and vice-versa. The rate of travel of the folding is substantially constant throughout the folding operation.

DESCRIPTION OF THE PREFERRED EMBODIMENT

The implement of this invention is referred to generally by the reference numeral 10 including a tool bar 12. Tool bar 12 comprises a main frame 14 and wing frames 16 and 18 pivotally connected thereto as will be described in more detail hereinafter. Main frame 14 includes conventional hitch structure 20 thereon for connecting the tool bar to a prime mover such as a tractor or the like. The tool bar 12 is designed to support or carry a plurality of ground working tools 22 mounted thereon in conventional fashion. Inasmuch as each of the wing frames 16 and 18 are identical, only the means of pivotally connecting the wing frame 16 to main frame 14 will be described in detail.

A pair of spaced apart plates 24 and 26 are welded to the outer end of main frame 14 and dwell in a vertical plane. For purposes of description, each of the plates 24 and 26 will be described as having an upper end, lower end, inner end, and an outer end. A pair of horizontally spaced apart plates 28 and 30 are mounted on the inner end of wing frame 16 and dwell in a vertical plane. The inner ends of plates 28 and 30 are received between the plates 24 and 26 as illustrated in the drawing. The upper ends of plates 24, 26, 28 and 30 are pivotally connected by means of a pin 32 extending therethrough. Link arm 34 is pivotally connected at its lower end to the inner ends of the plates 24 and 26 by means of pin 38 and extends upwardly therefrom. Link arm 36 is pivotally connected at its lower end to the outer ends of plates 28 and 30 respectively by pin 44 and extends upwardly therefrom. Support 46 is pivotally connected to the upper ends of the link arms 34 and 36 by pins 48 and 50 and extends therebetween as illustrated in the drawings.

A hydraulic cylinder 52 comprising cylinder body 54 and rod 56 is mounted on the support 46 by securing the cylinder body 54 thereto so that the rod 56 extends downwardly therefrom. Rod 56 is pivotally connected to the pin 32. The cylinder 52 is provided with ports 58 and 60 at the upper and lower ends thereof respectively which are in line with the hinge pin 32. Cylinder 52 is of the double-acting type and is operatively connected to the tractor hydraulic system. Plates 24, 26, 28 and 30 are provided with openings at their lower ends which register when the wing frame 16 is in the horizontal working position so that a lock-down pin 62 may be extended therethrough for maintaining the wing frame in its working position.

Assuming that the wing frame 16 is initially in the horizontal field working position of FIGS. 1 and 2, the method of folding the wing is as follows. Lock-down pin 62 is first removed with the hydraulic cylinder 52 then being actuated to cause the extension of the rod 56 from the body 54. Extension of rod 56 from body 54 causes the wing frame 16 to be pivotally moved upwardly around hinge pin 32 until the wing frame 16 has pivoted substantially 180° and is positioned over a portion of the main frame 14. A suitable support extends upwardly from main frame 14 and is designed to support the wing frame 16 thereon in the horizontal transport position. When it is desired to move the wing frame 16 to the field position, the hydraulic cylinder 52 is again actuated to cause the rod 56 to be retracted into the body 54 which causes the wing frame 16 to pivotally move from the horizontal transport position to the horizontal field working position. The lock-down pin 62 is then replaced through the plates 24, 26, 28 and 30 to maintain the wing frame in the field working position.

The linkage interconnecting the wing frame with the main frame is designed so that the rate of travel of the wing frame during its folding operation remains substantially constant. The means for pivotally connecting the wing frame to the main frame is quite simple but does not interfere with normal usage of the tool bar. In other words, the pivotal connection does not create any undesirable obstructions on the tool bar. The unique feature of the linkage pivotally connecting the wing frame to the main frame is that the hydraulic cylinder 52 acts as the secondary linkage to achieve the necessary and desirable folding operation.

Thus it can be seen that an agricultural implement having a folding tool bar has been described which accomplishes at least all of the stated objectives.

I claim:

1. An agricultural implement comprising,
   a tool bar having ground working tools operatively supported thereon,
   said tool bar comprising a main frame and at least one wing frame pivotally connected to one of the ends thereof, said wing frame having inner and outer ends,
   pivotal connection means interconnecting said main frame and said wing frame whereby said wing frame may be pivotally moved from a working position substantially 180 degrees to a transport position over a portion of said main frame,
   said pivotal connection means comprising a first support means secured to one end of said main frame and extending upwardly therefrom, said first support means having inner and outer end portions and an upper end portion; a second support means secured to the inner end of said wing frame and extending upwardly therefrom, said second support means having inner and outer end portions and an upper end portion, the upper end portions of said first and second support means being pivotally connected about a horizontal axis which is transversely disposed to the length of said tool bar; a first linkage means pivotally connected at one end to said first support means inwardly of and below said upper end portion of said first support means; a second linkage means pivotally connected at one end to said second support means outwardly of and below said upper end portion of said second support means; a third linkage means pivotally connected to and extending between the other ends of said first and second linkage means; a power cylinder positioned above said tool bar, said power cylinder including a cylinder body mounted on said third linkage means, said power cylinder having a cylinder rod movably extending therefrom which is pivotally connected to the pivotal connection between the said upper end portions of said first and second support means whereby extension of said cylinder rod from said cylinder body will pivotally move said wing frame from its said working position to its said transport position and whereby retraction of said cylinder rod into said cylinder body will pivotally move said wing frame from its transport position to its working position.

2. The implement of claim 1 wherein a lock-down pin removably extends through said first and second support means to maintain said wing frame in its working position.

3. The implement of claim 1 wherein said first and second linkage means extend upwardly from said first and second support means.

4. The implement of claim 1 wherein said first support means comprises a pair of vertically disposed and horizontally spaced supports secured to said main frame; said second support means comprising a pair of vertically disposed and horizontally spaced supports secured to said wing frame.

5. The implement of claim 4 wherein the pair of supports on said wing frame are partially received by the pair of supports on said main frame when said wing frame is in its working position.

* * * * *